United States Patent [19]
Surkin

[11] Patent Number: 5,947,357
[45] Date of Patent: Sep. 7, 1999

[54] BICYCLE RACK

[76] Inventor: Uri Surkin, 14001 S. Main St., Los Angeles, Calif. 90061

[21] Appl. No.: 09/063,106

[22] Filed: Apr. 20, 1998

[51] Int. Cl.[6] .................................................. B60R 9/10
[52] U.S. Cl. ....................... 224/536; 224/535; 224/537; 224/524; 224/525; 224/924; 211/5; 211/22
[58] Field of Search ........................... 224/924, 522–525, 224/531, 533–537, 319, 567–571, 545, 548, 552, 554, 564, 565, 526; 211/5, 17, 20, 22

[56] References Cited

U.S. PATENT DOCUMENTS

| | | |
|---|---|---|
| 484,941 | 10/1892 | Muller ........................................ 211/22 |
| 2,415,286 | 2/1947 | Hyde ........................................ 224/536 |
| 2,431,400 | 11/1947 | Iverson .................................. 224/924 X |
| 3,796,633 | 3/1974 | Mamoru Kikuchi et al. . |
| 3,853,255 | 12/1974 | Spencer . |
| 4,438,875 | 3/1984 | Fritsch . |
| 4,461,410 | 7/1984 | Tartaglia . |
| 4,676,414 | 6/1987 | Deguevara . |
| 4,804,120 | 2/1989 | Kraklio . |
| 4,823,997 | 4/1989 | Krieger . |
| 5,025,932 | 6/1991 | Jay . |
| 5,497,967 | 3/1996 | Gantois .................................. 211/22 X |
| 5,658,119 | 8/1997 | Allsop et al. ........................ 224/536 X |
| 5,820,002 | 10/1998 | Allen .................................. 224/924 X |

FOREIGN PATENT DOCUMENTS 2551705  3/1985  France .................................. 224/319

Primary Examiner—Gregory M. Vidovich
Attorney, Agent, or Firm—Oppenheimer Wolff & Donnelly LLP

[57] ABSTRACT

The bicycle rack mounts equipment to the back end of a vehicle. The rack has a base and at least one receiver mounted on the base. The receiver has upright walls extending upright from the base to a top spaced from the base. The upright walls forming a receiving space. One upright wall has a channel extending from the top of the upright wall. The channel has spaced-apart side edges. The receiving space receives a bicycle crank arm. A platform extends outward from an upright wall. The crank hub of a bicycle rest on the platform when the crank arm is in the receiver. A slot, which accepts the axle of the bicycle crank extend through the upright wall toward the platform. A securing member is positioned in the channel. It has a pair of flanges that extend beyond the side edges of the channel. A crank clamp on the securing member moves into and out of the receiving space for pushing against bicycle crank arm in the receiving space to secure the crank arm. At the same time, the crank clamp pushes the flanges on the securing member against the upright wall.

18 Claims, 4 Drawing Sheets

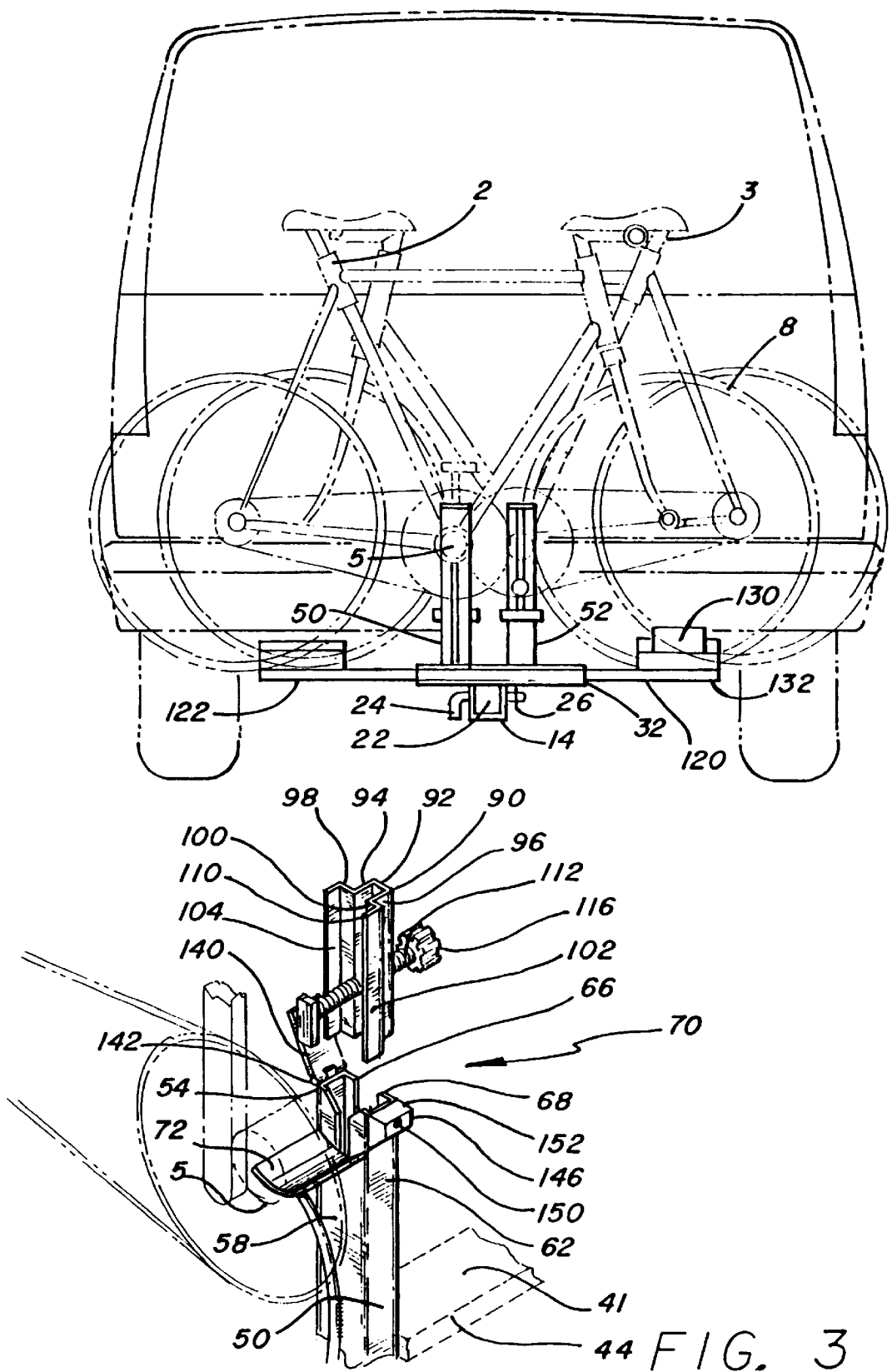

BICYCLE RACK

BACKGROUND OF THE INVENTION

1. Field of the Invention

The present invention relates to improved bicycle racks and their components.

2. General Background and State of the Art

Many racks exists for holding bicycles and other objects onto vehicles. One rack uses the bicycle's center brace to support the bicycle. Lock, U.S. Pat. No. 4,336,897 (1982), teaches a removable bicycle rack that attaches to the trunk and bumper of a conventional automobile. That rack also has a pair of carrying members to support the center bar of a bicycle crank. The bicycle then hangs down from the support member of Lock and applicant's earlier application.

Jay, U.S. Pat. No. 5,025,923 (1991), supports bicycle wheels on horizontal channels. The device also has an upright post into which the crank arm sits. A cap is inserted and locked in the post over the bicycle crank arm to prevent removal of the bicycle from the rack. Allsop, U.S. Pat. No. 5,658,119 (1997), disclose a post that receives a portion of the bicycle crank arm. A locking member projects into and out of the inside of the post to lock the crank arm against an inside wall at the post.

SUMMARY OF THE INVENTION

Building a better bicycle rack is the principal object of the present invention, and the present invention offers improvements over the prior art. This application discusses some of those improvements expressly, but some will be evident from the invention's description.

One object is the inclusion of structure that allows the user to attach a bicycle easily to the rack. In some prior art bicycle racks, proper positioning of a bicycle on the rack can be difficult. One part of the bicycle such as the wheel, may be positioned properly, but the user must insert the crank arm into an opening to position the crank arm properly. This may be difficult. As the crank arm turns, it may not enter the structure that secures the arm properly. Similarly, the securing structure itself may rotate the crank to a position that prevents its insertion into the securing structure. Eliminating or lessening this problem is an object of this invention.

Holding the crank arm securely is another object. Unless the arm is held securely, the bicycle can move. This could cause the wheels to move off their support. Conceivably, the wheel could pivot into the ground.

Another object is to provide security for a bicycle on the rack to prevent thieves from stealing the bicycle.

Another object is to make the bicycle rack inexpensively and to eliminate unnecessary parts.

The bicycle rack of the present invention has a base which mounts to a hitch connector that attaches to a vehicle. A receiver mounted on the base has upright walls extending upright from the base to a top spaced from the base. The upright walls form a receiving space. The walls form a channel, which has spaced-apart side edges. The channel extends along one of the upright walls. A platform extends outward from another upright wall. The rack also may have a slot or guide surface in the upright wall from which the platform extends. The slot or guide surface accepts the axle of the pedal crank and prevents lateral movement of the pedal crank axle.

A securing member can be positioned in the channel. It has a pair of flanges that extend beyond the side edges of the channel when the securing member is positioned in the channel. A crank clamp on the securing member can move into and out of the receiver and pushes against the bicycle pedal crank arm. Other structure in the securing member helps to hold the crank arm. Pushing the crank clamp against the crank arm also urges the flanges on the securing member against portions of the upright wall adjacent the channel. This holds the securing member in place and also secures the crank arm in the receiver. The inside of the receiver may have a guide projecting into the space between the upright walls. The guide helps position the crank arm within the receiver, and the crank clamp pushes the crank arm against the guide.

The rack also has an adjustable arm extending in one direction outward from the base for supporting one of the bicycle wheels. The other wheel is in the air and does not need support because the securing member fixes the position of the bicycle.

BRIEF DESCRIPTION OF THE DRAWINGS

FIG. 2 is a rear perspective view showing the bicycle rack of the present invention in its closed position mounted on the rear of a vehicle.

FIG. 3 is an exploded view of the portion of the bicycle rack of the present invention that receives and secures a bicycle pedal arm.

DETAILED DESCRIPTION OF THE PREFERRED EMBODIMENTS

Figure 1:
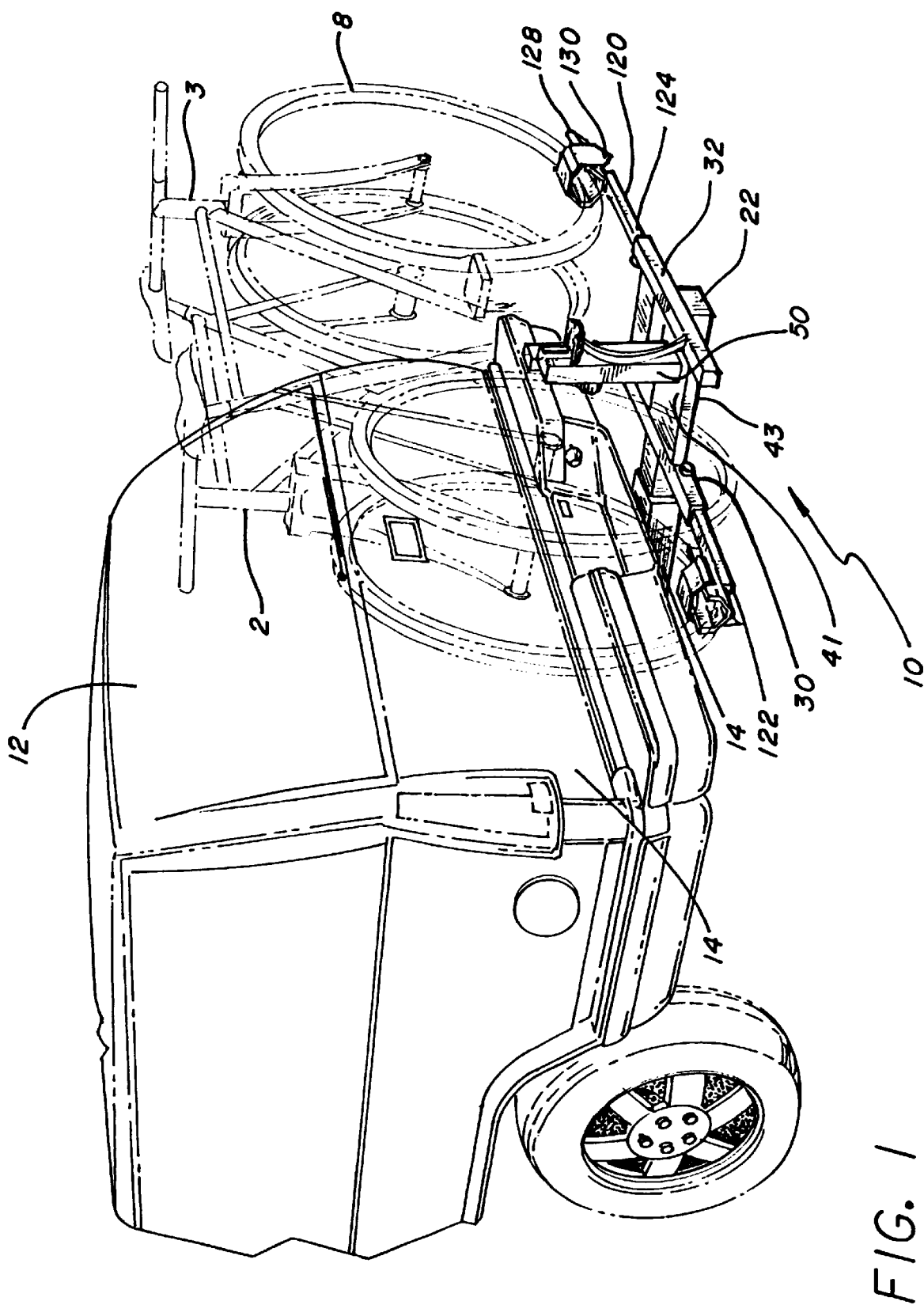
FIG. 1 is a rear perspective view showing the bicycle rack of the present invention mounted on the rear of a vehicle. The drawings depict bicycle and vehicle parts in phantom.

The bicycle rack 10 of the present invention mounts to a receiving hitch on a vehicle. FIG. 1 shows the rear portion of a typical sport utility vehicle (SUV) 12, which is not part of the present invention. Furthermore, although FIG. 1 shows the rack mounted to an SUV, it can mount to many other types of vehicles including trucks and vans.

Many SUVs have a receiving hitch as an option. Typically, the bicycle rack attaches to receiving hitch 14 (FIGS. 1 and 4) conventionally. Though the exemplary embodiment of this invention does not pivot, one could incorporate features of that other rack into this invention to allow this rack to pivot out of the way.

Figure 5:
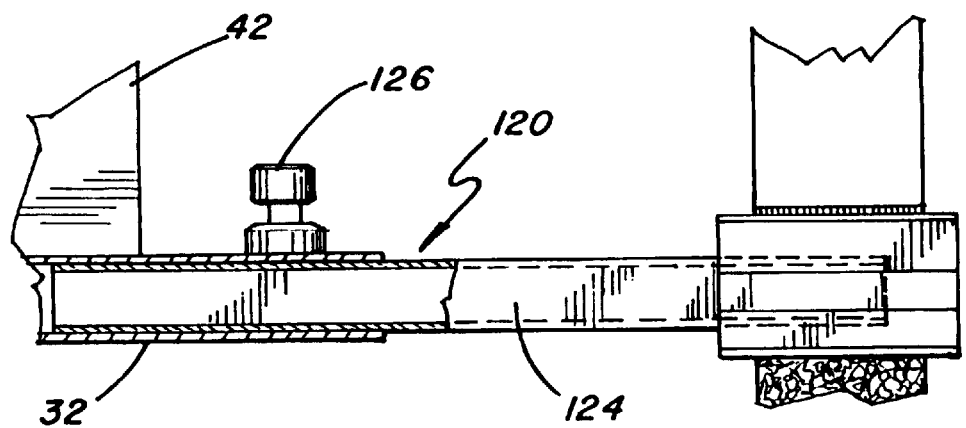
FIG. 5 is a top view, partially in section, showing a bicycle wheel support of the bicycle rack of the present invention.

The bicycle rack of the present invention includes a hitch connector 22 for attaching to the vehicle (FIGS. 1, 2 and 5). For strength the hitch connector is preferably 2 inch (5 cm) square tube steel with a ⅛ inch (3 mm) wall thickness. It is also about 21 in. (53 cm) long. Metric conversions are approximate and rounded. This and other steel parts are painted, galvanized or treated with corrosion resistance coating in the exemplary embodiment. Using stainless steel is an option, but it is much more expensive. Further, some parts are welded together, and welding stainless steel is more difficult and costly. Although other dimensions are possible, especially the length dimension, the standard vehicle hitch box is designed to receive a 2 in. square hitch connector (See FIG. 2).

The hitch box 14 can hold the hitch connector 22 in many different ways. In the exemplary embodiment, a pin 24 extends through aligned openings (not shown) on the hitch box and aligned openings (not shown) in the hitch connector (FIG. 2). A cotter pin 26 secures the pin 24 to prevent removal of the hitch connector (FIG. 2). In place of a cotter pin, one could use a pad lock.

A pair of horizontal arms 30 and 32 are welded to the hitch connector 22 (FIGS. 1, 2, 5 and 6). The horizontal arms are parallel to each other and are perpendicular to the hitch connector. The horizontal arms are 1¼" (3 cm) square steel tubing in the exemplary embodiment. Other sizes of tubing are permissible. The tubing is painted or galvanized for corrosion resistance. As an alternate, an elongated angle bracket can replace the tubing. The angle bracket would be 1" (1.5 cm) high and 1.5" (3.8 cm) wide.

In the exemplary embodiment, each horizontal arm is approximately 14" (36 cm) long. For reasons that will become apparent, each horizontal arm extends about 6" (15 cm) from one side of the center of hitch connector 22 and 8" (20 cm) in the other direction. The longer dimension of each horizontal arm extends in the opposite direction than the longer direction of the other horizontal arm.

A base extends between the horizontal arms. In the exemplary embodiment, the base 40 (FIG. 4) has two discreet sections, base members 41 and 42 (FIG. 1). Each base member in the exemplary embodiment is ⅛" (3 mm) thick. Each is about 7" (18 cm) long (front to back) and 5" (13 cm) wide and has side walls 43 and 44 (FIGS. 1 and 3), which are bent downward in a press. The side walls provide added rigidity to the base members. The ends of base members 41 and 42 are welded to horizontal arms 30 and 32. The bottom edge of the inside sidewalls of base members 41 and 42 may be welded to the hitch connector as well. As FIG. 1 shows, the base is generally horizontal when the rack is mounted to a vehicle.

The exemplary embodiment has a pair of receivers 50 and 52 for securing bicycles 2 and 3 (FIGS. 1 and 2). For reasons that are apparent, the bicycles face in opposite directions. Consequently, the receivers face in opposite directions also. FIGS. 1 and 2 show that the receives are spaced apart laterally and from the vehicle approximately 8" (20 cm) side to side (center line to center line) and about 4" (10 cm) front to back.

Figure 6:
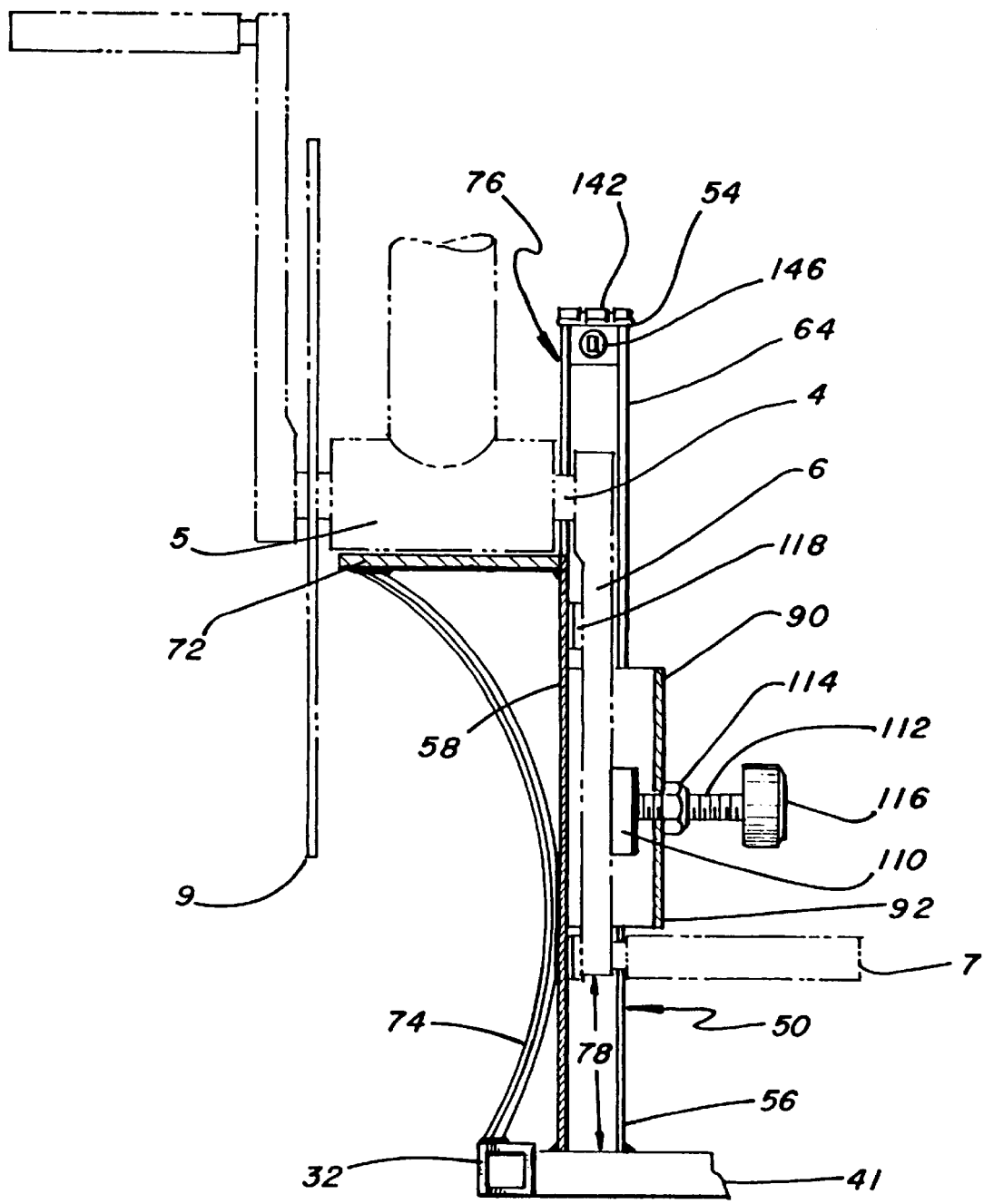
FIG. 6 is a side sectional view of part of the bicycle rack of the present invention that receives and secures a bicycle pedal arm

Each receiver has upright walls extending from the base to a top. FIGS. 3 and 6 show receiver 50 in detail. In the exemplary embodiment, receiver 50 is elongated from no0 a top 54 to a bottom 56 (FIG. 6). Receiver 50 has a rear wall 58 and side walls 60 and 62 (FIG. 3). The side 64 opposite upright wall 58 is open. The exemplary embodiment has inwardly facing flanges 66 and 68 (FIG. 3) that partially close the sides of a channel 70.

Each receiver is about 2¾" (7 cm) wide and 1¾" (4 cm) deep. The bottom of each receiver is welded to one of the base members 41 or 42 (FIG. 1).

channel 70 is about 1½" (4 cm) wide. In the exemplary embodiment, the opening extends the entire height of the receiver. A portion of the bottom of the opening could be closed.

As will be discussed below, the flanges 66 and 68 that face in wardly in the exemplary embodiment could face in the opposite direction. Similarly, the flanges could be folded additionally so that they terminate with edges facing the other side of the receiver.

A platform extends outwardly from an upright wall. In the exemplary embodiment, the platform 72 is welded to upright wall 58 (FIGS. 3 and 6). A curved brace 74 is welded between to the upright wall 58, platform 72 and horizontal arm 32 to provide added strength for the platform. Wall 58 also has a slot 76 in the exemplary embodiment. As the drawings show, the slot terminates at the top of the platform.

In use, one places the bicycle such that the axle 4 rests at the bottom of slot 76 (FIGS. 3 and 6). At that position, axle hub 5 rests on platform 72. Pedal crank arm 6 extends down in the inside of receiver 50, and pedal 7 projects out channel 70. Note the substantial space 78 (FIG. 6) between the bottom of crank arm 6 and base member 41 at the bottom 56 of receiver 50. Larger bicycles than the ones shown in the drawing may have longer crank arms. The present invention supports the bicycle's weight through axle hub 5, which rests on platform 70. Neither the pedal nor the end of the crank arm support the bicycle's weight.

In the exemplary embodiment, slot 76 continues to the platform. Therefore, the bottom of the slot does not contact axle 4 (FIG. 6). Slot 74 helps to secure axle 4 from lateral movement. In place of a slot, the platform can be moved upward so that no part of axle 4 contacts any part of the receiver. Alternatively, the top of upright wall 58 can have a V-shaped or a rounded notch to limit the axle's side-to-side movement.

To secure the bicycle to the rack, a securing member is positionable in the channel. In the exemplary embodiment securing member 90 (FIGS. 3 and 6) is formed of bent sheet steel. The bending forms an outside wall 92, a pair of spaced rear walls 94 and 96, which are parallel to each other and perpendicular to rear wall 92, and a pair of shoulder walls 98 and 100, which extend outward from one of the walls 94 and 96. Finally, the securing member has two forwardly projecting walls 102 and 104. The distance between the outsides of the forwardly projecting walls 102 and 104 is slightly less than the distance between the insides of the side upright walls of receiver 50. Consequently, the securing member can slide vertically within the receiver, but it cannot rotate. Once the securing member is within the receiver, shoulder walls 98 and 100 act as flanges which extend beyond the inside edge of flanges 66 and 68 of the receiver.

The securing member has a crank clamp 110 (FIGS. 3 and 6), which can pivot on the end of threaded member 112. The crank clamp may have a flat end or a V-shaped end. The latter end traps the bicycle crank arm 6. The threaded member passes through a nut 114 (FIG. 6) or other female threaded part, which is welded on the rear wall 92 of the securing member. Consequently, rotating the handle 116, which is fixed to the threaded shaft 112, moves the crank clamp 110 toward or away from rear wall 58 of the receiver. When the securing member is received in the receiver, the crank clamp moves into and out of the receiver. When the pedal crank arm 6 is within the receiver (FIG. 6), the crank clamp 110 moves against the crank arm 6 to secure the crank arm solidly within the receiver.

A small crank arm guide 118 (FIG. 6) may mount against the receiver's rear wall 58. Although the drawings do not show the shape of guide 118, it preferably has a V-shaped or concave face toward the inside of the receiver and may be stainless steel, aluminum or painted steel. Screws, bolts or other fasteners attach the guide to the rear wall of the receiver, but it also could be welded or otherwise fastened.

The user can position the securing member vertically along the crank arm 6. In FIG. 6, the securing member 90 is shown adjacent pedal 7. In fact, the securing member can rest on the pedal to prevent the crank arm from sliding vertically within the receiver. The securing member also could be positioned such that the crank clamp is closer to the axle 4.

When the user mounts the bicycle to the rack, he or she positions the axle hub 5 on the platform 72. Because opening 70 is wide, the user can easily fit the crank arm 6 through the opening. At this stage, the crank arm may contact guide 118 (FIG. 6). Similarly, the crank axle 4 rests in slot 76. The user then slides the securing member 90 into the receiver 50. The user then tightens handle 116 to urge the crank clamp 110 toward and against the crank. The force pushes the crank against positioner 118. The force from the continued handle rotation also urges the flanges on the securing member against portions of the upright wall adjacent the channel.

The securing member 90 has the outwardly facing shoulder walls 98 and 100 that fit behind the inwardly facing flanges 66 and 68 of the receiver. The receiver also could have walls facing outward. In that case, the securing member would have walls that wrap around the outwardly facing walls of the receiver. If that were the case, the receiver could be made narrower but still be sufficiently wide to accommodate the bicycle crank arm.

The rack also includes a pair of tire supports that extend out one end of each horizontal arm. As FIGS. 1, 2 and 5 show, one tire support 120 extends to the right of its horizontal arm 32, and the other tire support 122 extends to the left of its horizontal arm 30. In one embodiment, tire support 120 (FIG. 5) comprises a square post 124 that is about 24 in (70 cm) long. The post has outside dimensions slightly less than the inside dimensions of the square horizontal arm 32. Consequently, arm 124 slides within horizontal arm 32 (FIG. 5) and can telescope into and out of the arm. A set screw 126 secures the tire support arm 124 in place.

A tire receiving channel 128 attaches to the end of arm 124, and a bicycle tire 8 (FIG. 1) rests in the channel. The channel in the exemplary embodiment is 6½ in (17 cm) long and 2½ in (6 cm) wide at the top. It tapers from the top to a narrower base. The base also is curved slightly to conform to the tire. A short Velcro® (hook and loop fastener) strap 130 extends through opposing slots (not shown) near the base of the walls 132 and 134 that form the channel.

Normally, one would position post 124 laterally until channel 128 is under the bicycle tire 8. The strap 130 then passes around the rim and is fastened to itself. That secures the tire into the channel. The other tire does not rest in any guide.

In place of a tubular tire support, one could use a matching L-bracket. Recall that an L-shaped horizontal arm is an alternate embodiment. An L-bracket aligns with the L-shaped horizontal arm. Walls that face each other would have spaced holes. One would then align appropriate holes in order to position a tire receiving cup under a tire.

Figure 4:
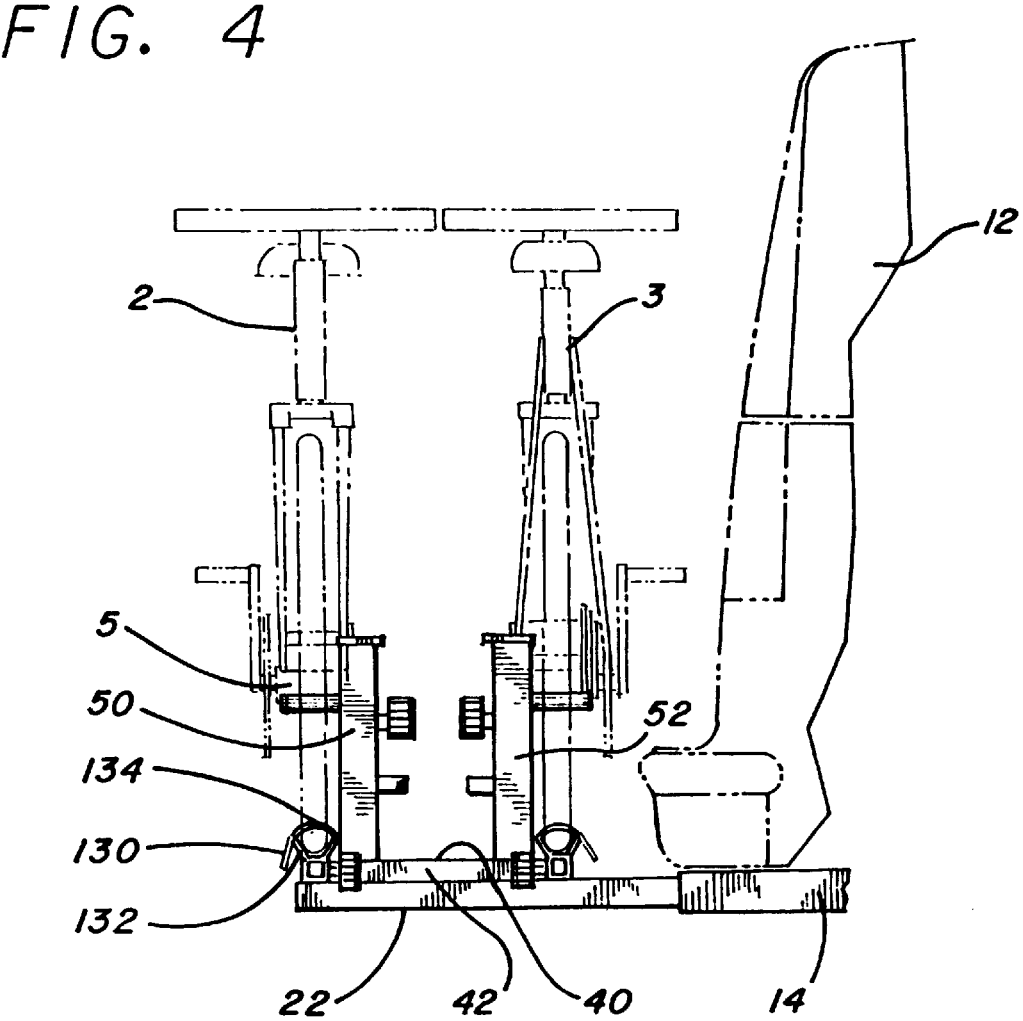
FIG. 4 is a side view the bicycle rack of the present invention mounted on the rear of a vehicle.

As FIGS. 1, 2 and 4 show, bicycles 2 and 3 face in opposite directions. Likewise, the receivers also face in opposite directions. That allows easier access to handle 116 so that one can release the crank clamp 110. The bicycles usually must face in a particular direction. Bicycles typically have a pedal gear 9 (FIG. 6). It faces away from the receiver 50 so that it does not interfere with a receiver and the structure adjacent the receiver. Similar structure on the other bicycle faces in the opposite direction.

The rack of the present invention provides systems for preventing theft of the rack and of a bicycle from the rack. As mentioned previously, one can use a lock in place of pin 24 to hold the rack to the trailer hitch. Second, post 124 may have a hole (not shown) at its end opposite guide 132. By placing a lock, which cooperates with arm 32, through the hole, a thief cannot remove the post from the horizontal arm 32.

The rack also has locks for preventing a thief from removing the crank arm 6 from the receiver 50. In its most simple form, the locking system is merely a pair of holes through opposing upright walls of the receiver 50. A lock then fits through the holes after the crank arm is within the receiver. The lock blocks removal of the crank arm.

In another system that the drawings show, a door 140 mounts to a hinge 142 on one of the side upright walls (e.g., wall 60) of the receiver (FIGS. 3 and 6). The door completely covers the top of the receiver when the door is closed. The underside of the door has a latch near the end of the door. A rotary key lock 146 (FIG. 6) mounts in one of upright walls. The lock has a latch 148 that can rotate into engagement with the door latch. One can remove the key (not shown) and the lock remains locked.

Although the latch of the lock can protrude into the receiver, the lock may mount on a wall 150 spaced from the outside of the upright wall. The latch of the lock is within a cavity 152 adjacent to the upright wall. The door 140 is long enough to cover the receiver and the cavity. By having this latter arrangement, the lock parts do not block any of the inside space of the receiver. Further, the lock is protected within its cavity from damage caused by the bicycle crank arm.

The specification describes particular embodiments of the present invention. However, those of ordinary skill can devise variations of the present invention without departing from the inventive concept. Accordingly, only the claims define the invention.

I claim:

1. A vehicle rack comprising:
   a) a base;
   b) an upright receiver, the receiver having upright walls extending upright from the base to a top spaced from the base, the upright walls forming a receiving space therebetween, at least one upright wall having a channel extending from the top of the one upright wall, the channel having spaced-apart side edges defining the channel;
   c) a platform extending outward from one of the upright walls;
   d) a crank receiver in the upright wall from which the platform extends, the crank receiver extending from the top of the upright wall from which the platform extends toward the platform;
   e) a securing member positionable in the channel and having a pair of flanges that extend beyond the side edges of the channel when the securing member is positioned in the channel; and
   f) a crank clamp on the securing member mounted for movement into and out of the receiving space for pushing against a crank arm of a cycle in the receiving space, the crank clamp urging the flanges on the securing member against portions of the upright wall adjacent the channel.

2. The vehicle rack of claim 1 wherein the channel extends from the top of the one upright wall continuously to the base.

3. The vehicle rack of claim 1 wherein the base is generally horizontal, at least one horizontal arm attached to the base, and a channel member mounted to the horizontal arm and positionable relative to the base for being positioned under a tire of the cycle.

4. The vehicle rack of claim 1 wherein the channel member mounts to a post that telescopically moves with respect to the horizontal arm, the post being parallel with the base.

5. The vehicle rack of claim 1 further comprising a lock adjacent the top of the upright receiver for blocking removal of the cycle from the upright receiver.

6. The vehicle rack of claim 5 wherein the lock comprises a door pivoting on the top of the upright receiver, a latching lock mounted to the upright receiver and having a latch rotating against a part of the door for securing the door over the upright receiver.

7. The vehicle rack of claim 1 further comprising a crank arm guide in the upright receiver positioned to contact the crank arm, the crank clamp pushing the crank arm against the crank arm guide.

8. The vehicle rack of claim 1 wherein the crank receiver extends from the top of the upright receiver to the platform.

9. The vehicle rack of claim 8 further comprising a slot in the crank receiver adjacent the platform for receiving a portion of the cycle.

10. A vehicle rack for carrying a bicycle, the rack comprising:

a) a base;
   b) an upright receiver, the receiver having upright walls extending upright from the base to a top spaced from the base, the upright walls forming a receiving space therebetween, at least one upright wall having a channel extending from the top of the one upright wall, the channel having spaced-apart side edges defining the channel, the receiving space for receiving a crank arm of the bicycle, such crank arm having a crank end and a pedal at a pedal end, the crank end being toward the top of the upright walls;
   c) a platform extending outward from one of the upright walls;
   d) a crank receiver in the upright wall from which the platform extends, the crank receiver extending from the top of the upright wall from which the platform extends toward the platform, a portion of the crank end of the crank arm extending through the crank receiver above the platform, the platform acting as a support for the pedal on the crank arm;
   e) a securing member positionable in the channel and having a pair of flanges that extend beyond the side edges of the channel when the securing member is positioned in the channel; and
   f) a crank clamp on the securing member mounted for movement into and out of the receiving space for pushing against the crank arm in the receiving space, the crank clamp urging the flanges on the securing member against portions of the upright wall adjacent the channel.

11. The vehicle rack of claim 10 wherein the channel extends from the top of the one upright wall continuously to the base.

12. The vehicle rack of claim 10 wherein the base is generally horizontal, at least one horizontal arm attached to the base, and a channel member mounted to the horizontal arm and positionable relative to the base for being positioned under a tire of the bicycle.

13. The vehicle rack of claim 10 wherein the channel member mounts to a post that telescopically moves with respect to the horizontal arm, the post being parallel with the base.

14. The vehicle rack of claim 10 further comprising a lock adjacent the top of the upright receiver for blocking removal of the bicycle from the upright receiver.

15. The vehicle rack of claim 14 wherein the lock comprises a door pivoting on the top of the upright receiver, a latching lock mounted to the upright receiver and having a latch rotating against a part of the door for securing the door over the upright receiver.

16. The vehicle rack of claim 10 further comprising a crank arm guide in the upright receiver positioned to contact the crank arm, the crank clamp pushing the crank arm against the crank arm guide.

17. The vehicle rack of claim 10 wherein the crank receiver extends from the top of the upright receiver to the platform.

18. The vehicle rack of claim 17 further comprising a slot in the crank receiver adjacent the platform for receiving a portion of the bicycle.

* * * * *